US010730689B2

(12) United States Patent
Yancy (10) Patent No.: US 10,730,689 B2
(45) Date of Patent: Aug. 4, 2020

(54) PROTECTIVE PHONE COVER DISPENSER (71) Applicant: Eric Albert Yancy, Indianapolis, IN (US)

(72) Inventor: Eric Albert Yancy, Indianapolis, IN (US)

( * ) Notice: Subject to any disclaimer, the term of this patent is extended or adjusted under 35 U.S.C. 154(b) by 0 days.

(21) Appl. No.: 16/428,709

(22) Filed: May 31, 2019

(65) Prior Publication Data
US 2019/0367254 A1 Dec. 5, 2019

Related U.S. Application Data (60) Provisional application No. 62/678,761, filed on May 31, 2018.

(51) Int. Cl.
B65D 83/08 (2006.01)

(52) U.S. Cl.
CPC .................. B65D 83/0817 (2013.01)

(58) Field of Classification Search
USPC .............. 221/45, 197, 287, 52, 3, 192, 232; 312/71
See application file for complete search history.

(56) References Cited

U.S. PATENT DOCUMENTS

| 4,887,737 A * | 12/1989 | Adenau ............... A47F 1/126 221/3 |
| 5,632,409 A | 5/1997 | Raghunanan |
| 6,237,805 B1 | 5/2001 | Katsanevas |
| 6,651,827 B1 | 11/2003 | Eberwein et al. |
| 6,889,868 B2 * | 5/2005 | Magid ............... B65D 83/12 221/197 |
| 8,387,165 B1 | 3/2013 | Sakin |
| 9,917,611 B2 * | 3/2018 | Wang ............... H04B 1/3888 |
| 2013/0270126 A1 * | 10/2013 | Oliver ............... A45C 15/00 206/38 |
| 2015/0014348 A1 * | 1/2015 | Tedesco ............... A47K 10/424 221/282 |

OTHER PUBLICATIONS

Ultra Clear, Disposable, Protective Sleeves for iPads, https://www.amazon.com/Ultra-Clear-Disposable-Protective-Sleeves/dp/B0095JN01I.
Antimicrobial SmartSleeves for Phones, https://www.clearbags.com/spec/smartsleeves/antimicrobial.

* cited by examiner

Primary Examiner — Gene O Crawford
Assistant Examiner — Ayodeji T Ojofeitimi (57) ABSTRACT A protective phone cover dispenser dispenses sleeves that isolate a phone from contaminants in the external environment. The dispenser has a container, a storage compartment, a set of protective covers, an access hole, and an external device coupler. the storage compartment is located within the container and acts as a holding chamber for the set of protective covers. Each of the protective covers is a sleeve that is used to envelop the phone. Thus, isolating the phone from contaminants in the external environment. The access hole traverses through the container into the interior compartment so that a user is able to retrieve the protective covers stored within the interior compartment. The external device coupler is mounted onto the exterior surface of the container and is positioned offset from the access hole. Thus, the dispenser can be mounted onto an external structure without hindering the user from retrieving protective covers.

7 Claims, 7 Drawing Sheets

PROTECTIVE PHONE COVER DISPENSER

The current application claims a priority to the U.S. Provisional Patent application Ser. No. 62/678,761 filed on May 31, 2018.

FIELD OF THE INVENTION

The present invention generally relates to a personal protection device. More specifically, the present invention is a device that allows users to protect their mobile personal device while using restroom facilities.

BACKGROUND OF THE INVENTION

As technology develops people continuously seek methods to improve the overall quality of life. Advanced computer systems are now replacing tasks that were previously performed by humans. Furthermore, the widespread internet access has allowed for advanced technological advancements in most aspects of life. The internet of things (IoT) is defined as the network of physical devices that include connectivity features. Most modern physical devices comprise a computing system that allow for the collection and exchange of data. The IoT allows for physical objects to be controlled via an extensive and accessible universal network. Connectivity and the transfer of the data is crucial for existing technologies. The widespread popularity of mobile devices altered modern lifestyle. People have become increasingly depended on the functionality of mobile devices.

Mobile devices have virtually limitless capabilities, and as such most users use them at all times. In addition, most modern mobile devices rely on the use of a tactile interface which users must interact with to control the device. The higher the frequency with which users check their mobile phone, the higher the opportunity to transfer numerous germs and bacteria to the surface. Numerous studies have been conducted in recent years, and the results align under the same conclusion, mobile phones are a perfect environment for germs and bacteria to develop. Some users choose to take their mobile phone to the bathroom, using their mobile device while using the facilities.

DETAIL DESCRIPTIONS OF THE INVENTION

All illustrations of the drawings are for the purpose of describing selected versions of the present invention and are not intended to limit the scope of the present invention.

Referring to FIG. 1 through FIG. 7, the preferred embodiment of the present invention, the protective phone cover dispenser, is a device that uses disposable covers to prevent contaminants in an external environment from being deposited on the surface of a phone, or other type of electronic device. The present invention is a dispenser that is designed to be mounted within a bathroom stall to provide a user with a protective sheath for the user's phone. The protective sheath encapsulates the phone while the user is using the facilities. Thus, preventing bacteria and other contaminants from being deposited onto the phone. To achieve this functionality, the present invention comprises a container 1, a storage compartment 11, a plurality of protective covers 4, an access hole 12 and an external device coupler 3. Preferably, the container 1 is a rigid box that is used to store and dispense the plurality of protective covers 4. To that end, the storage compartment 11 normally traverses into the container 1. Thus, creating a receptacle for the plurality of protective covers 4 that are mounted within the storage compartment 11. As a result, the plurality of protective covers 4 is housed within the container 1 and isolated from contaminants within the external environment. The access hole 12 normally traverses into the interior compartment through a first face 15 of the container 1. As a result, the user is able to pull out as many of the protective covers 4 as required. That is, the access hole 12 functions as an outlet through which the plurality of protective covers 4 are dispensed. Preferably, the plurality of protective covers 4 is serially arranged in a stack where a frontmost protective cover 4 is positioned adjacent to the access hole 12, and a rearmost protective cover 4 is positioned toward an interior wall of the interior compartment. This configuration enables each subsequent protective cover 4 to be positioned adjacent to the access hole 12 after the frontmost protective cover 4 is dispensed through the access hole 12. The external device coupler 3 is a fastening system that enables the present invention to be mounted onto an external surface. To that end, the external device coupler 3 is laterally mounted onto the container 1. Additionally, the external device coupler 3 is positioned offset from the access hole 12 across the container 1. As a result, the present invention can be mounted onto the external surface without hindering the user's ability to retrieve any number of the plurality of protective covers 4 through the access hole 12.

Figure 3:
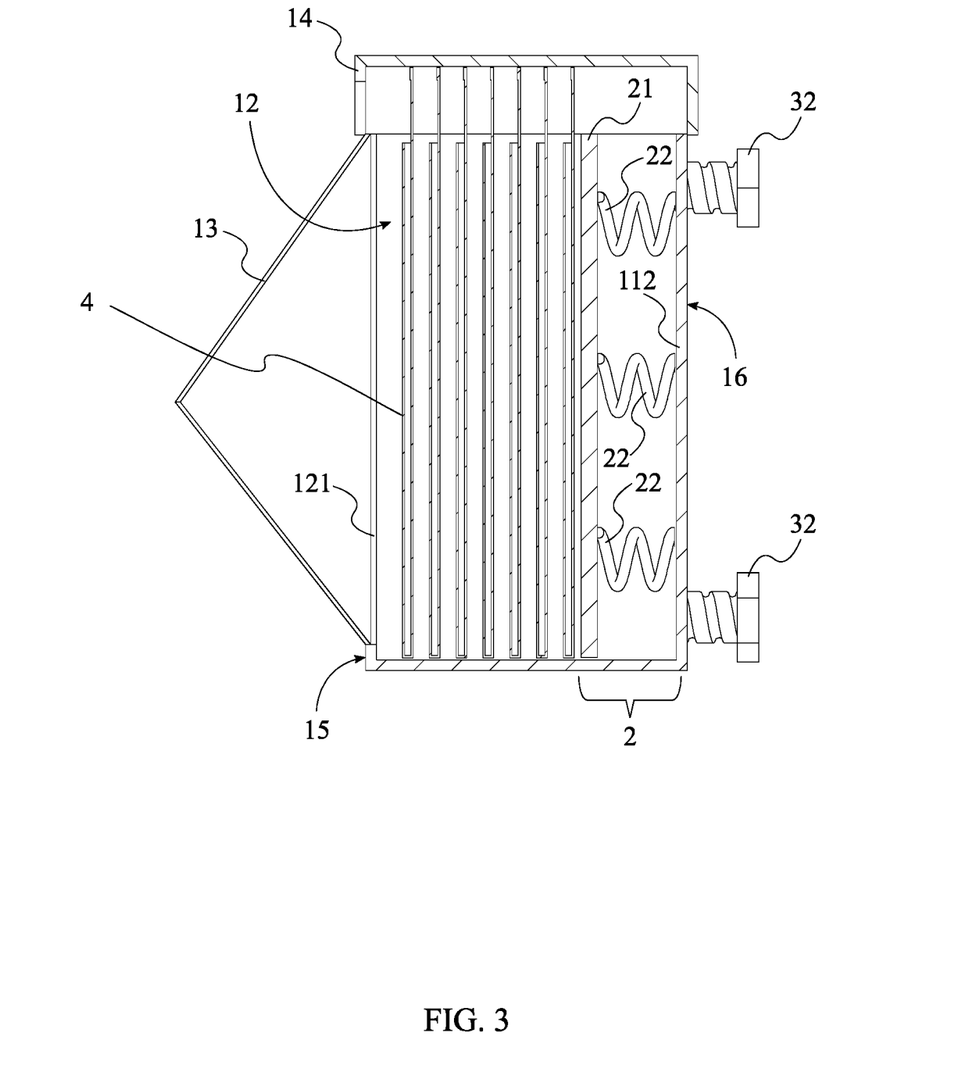
FIG. 3 is a right-side sectional view of the present invention taken along line 3-3 in FIG. 2.
Figure 4:
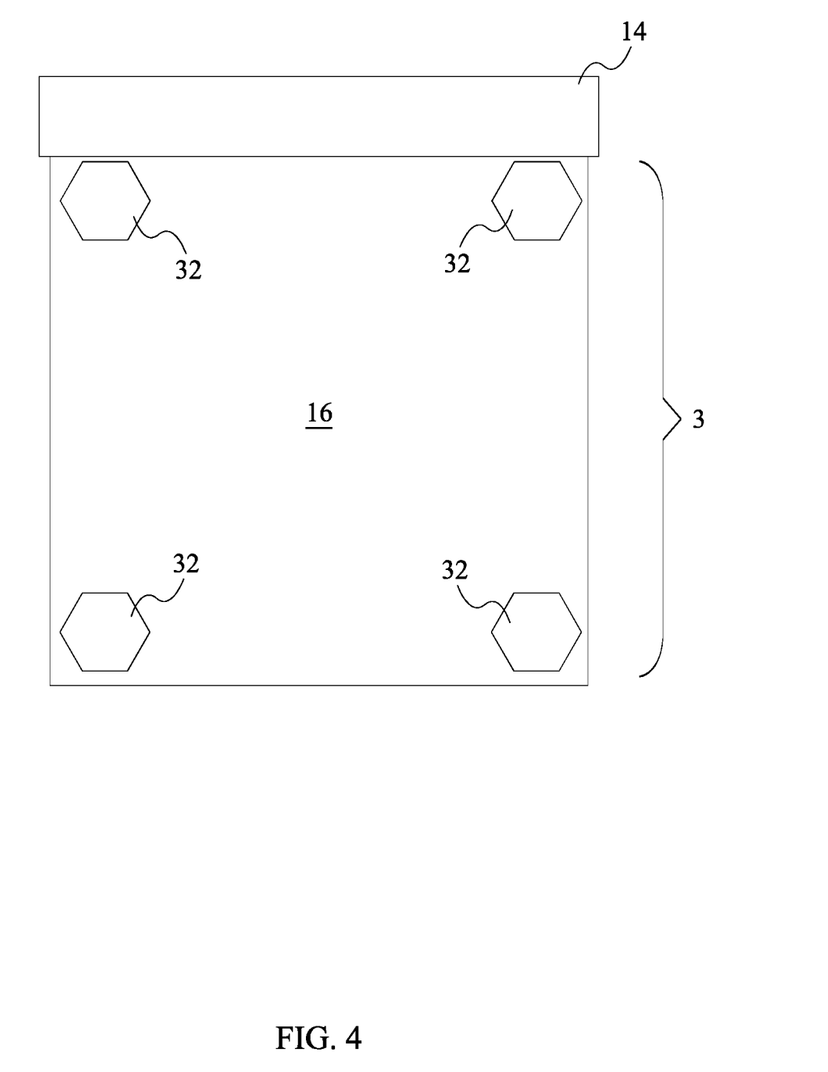
FIG. 4 is a rear view of the present invention.
Figure 5:
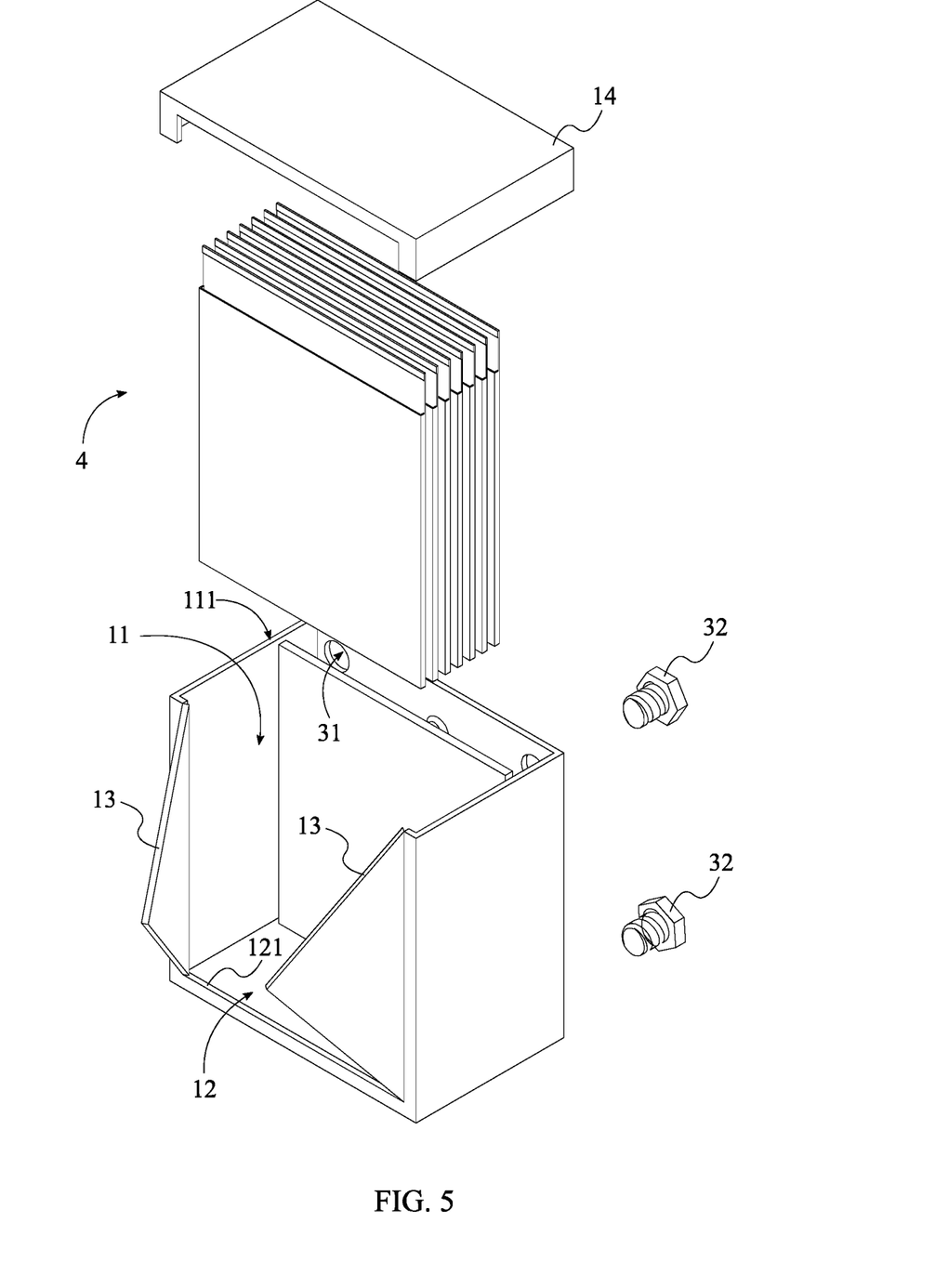
FIG. 5 is an exploded perspective view of the present invention.

Referring to FIG. 3 and FIG. 5, the present invention further comprises a dispensing mechanism 2. The dispensing mechanism 2 is a device that forces the plurality of protective covers 4 closer to the access hole 12. Thus, facilitating dispensing the plurality of protective covers 4 through the access hole 12. Specifically, the dispensing mechanism 2 is mounted within the storage compartment 11. Additionally, the dispensing mechanism 2 is positioned in between a lateral sidewall 112 of the interior compartment and the plurality of protective covers 4. As a result, the dispensing mechanism 2 is used to move the stack of protective covers 4 closer to the access hole 12 whenever the frontmost protective cover 4 is removed by the user. This functionality ensures that the user is able to retrieve even the rearmost protective cover 4 without extensive effort. Preferably, the dispensing mechanism 2 comprises at least one spring 22 and a press plate 21. The spring 22 is positioned in between the press plate 21 and the lateral sidewall 112. Additionally, the press plate 21 is pressed against the plurality of protective covers 4. Accordingly, the spring 22 provides the force required to move the plurality of protective covers 4 toward the access hole 12. Further, the press plate 21 evenly distributes the force generated by the spring 22 across a surface of the rearmost protective cover 4. This configuration ensures that the plurality of protective covers 4 is retained in a position that facilitates dispensing the plurality of protective covers 4 through the access hole 12. In an alternative embodiment, the spring 22 is replaced by a motorized system that can be controlled by the user or a remote controller system.

Figure 6:
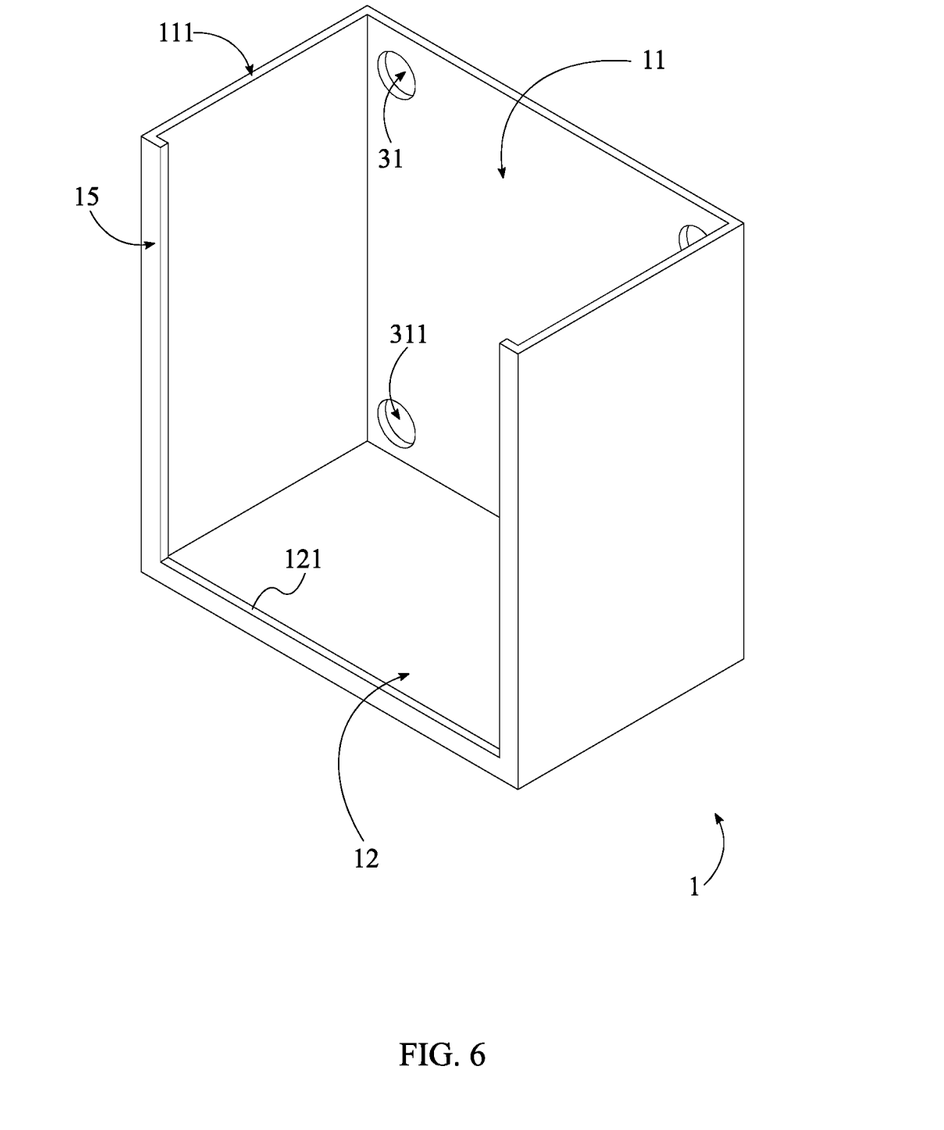
FIG. 6 is a perspective view of the container used in the present invention.

Referring to FIG. 5 and FIG. 6, the present invention is designed to be mounted onto various types of external structures. To that end, the external device coupler 3 comprises a plurality of mounting holes 31 and a plurality of fasteners 32. The plurality of mounting holes 31 traverses into a second face 16 of the container 1, opposite to the access hole 12. Thus, forming female receptacles for the plurality of fasteners 32. Additionally, the plurality of mounting holes 31 is distributed across the second face 16. Additionally, each of the plurality of fasteners 32 is engaged into a corresponding hole 311 from the plurality of mounting holes 31. As a result, the present invention can be mounted onto external surfaces that vary in shape, and linearity.

Figure 1:
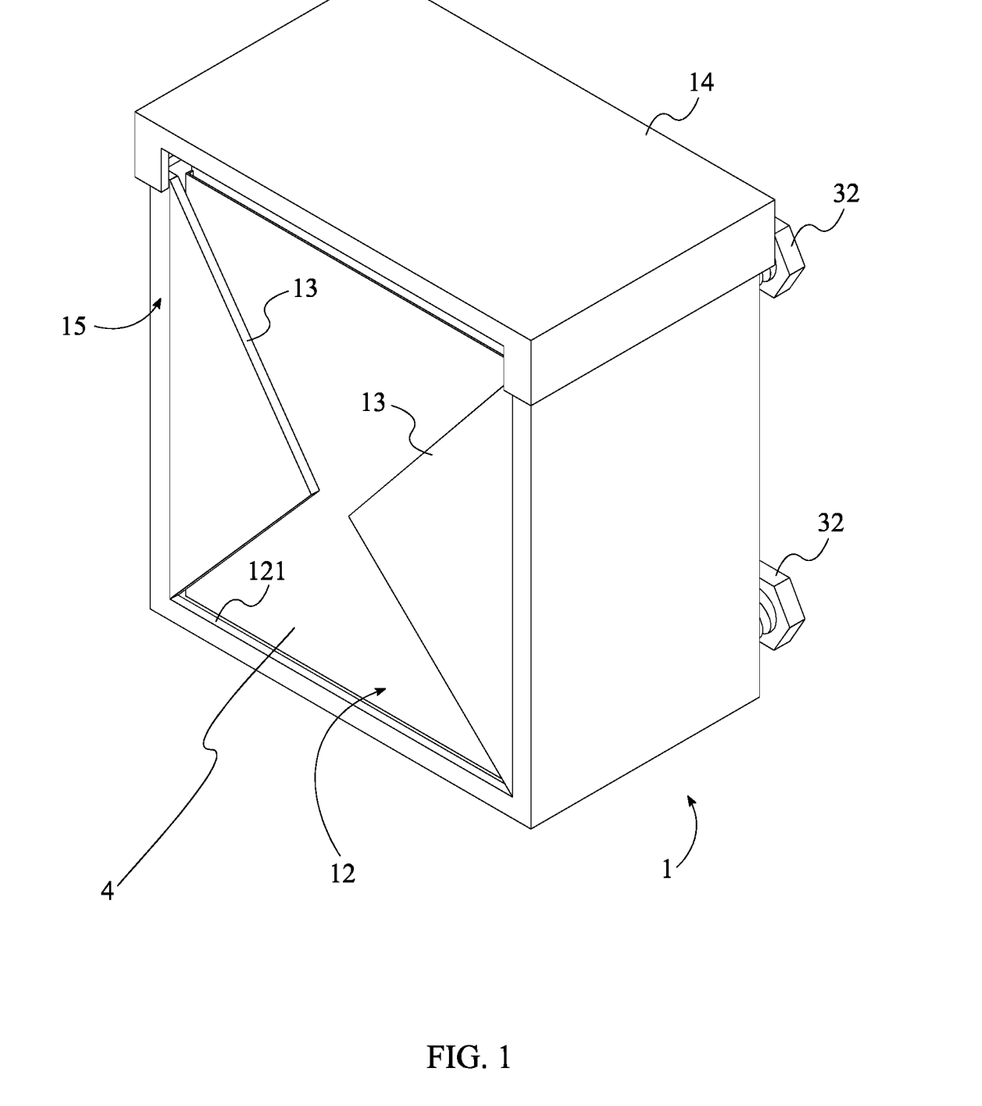
FIG. 1 is an isometric perspective view of the present invention.
Figure 2:
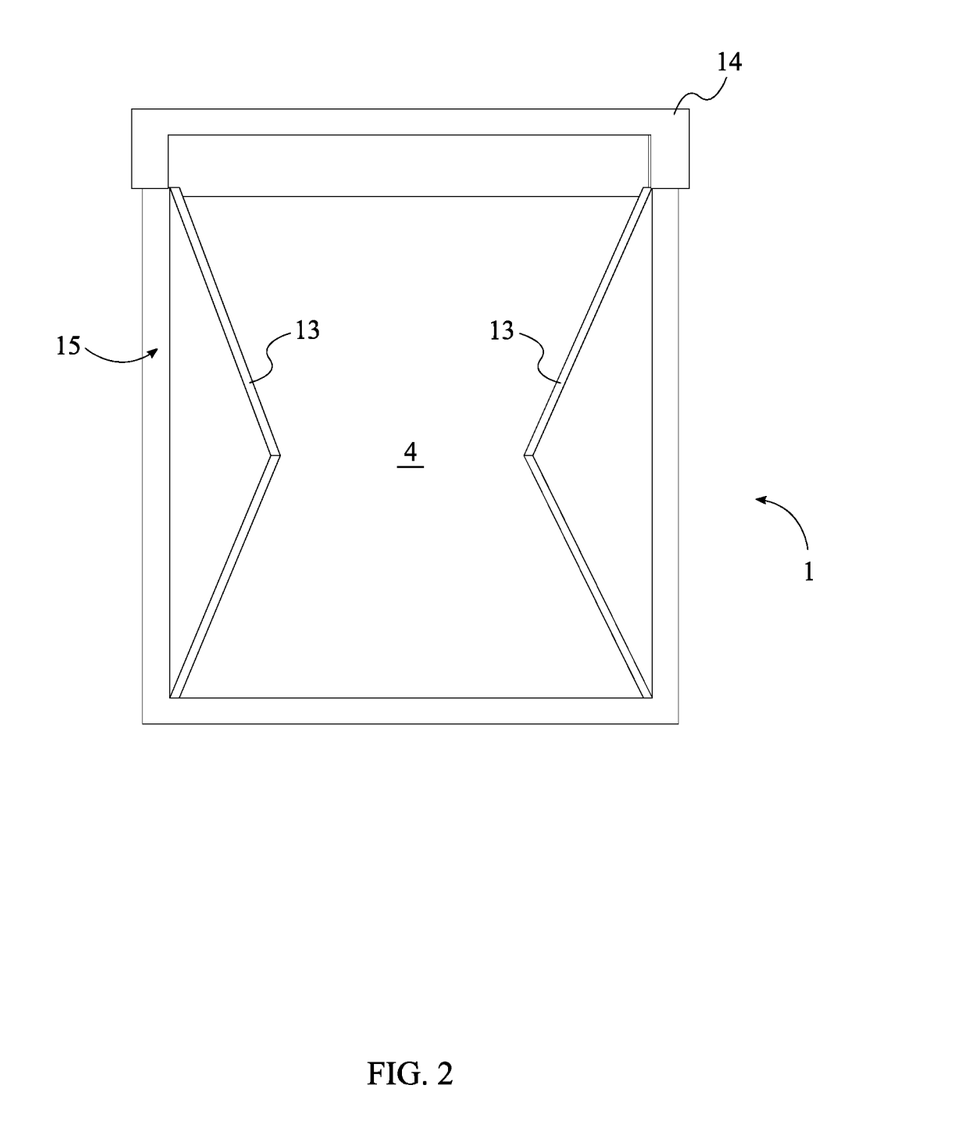
FIG. 2 is a front view of the present invention.

Referring to FIG. 1 and FIG. 5, as described above, the container 1 is designed to isolate the plurality of protective covers 4 from contaminants in the external environment. To achieve this functionality, the present invention further comprises a plurality of access doors 13. Each of the plurality of access doors 13 is hingedly mounted to a rim 121 of the access hole 12. Additionally, the plurality of access doors 13 is distributed around the access hole 12. As a result, the plurality of access doors 13 is able to shield the plurality of protective covers 4 without hindering the user's ability to retrieve and number of the protective covers 4 through the access hole 12. Preferably, the hinged connection between the plurality of access doors 13 and the rim 121 of the access hole 12 includes a biasing spring that compels the plurality of access doors 13 to close when the user is not retrieving at least one cover from the plurality of protective covers 4. Some embodiments feature access doors 13 that are made from flexible material which bend to enable the user to retrieve the plurality of protective covers 4 through the access hole 12. Preferably each of the plurality of access doors 13 is a triangular panel. Further, each of the plurality of access doors 13 is positioned offset from one another. Thus, facilitating opening the plurality of access doors 13 and retrieving the plurality of protective covers 4 through the access hole 12. The present invention further comprises a lid 14. The lid 14 is mounted over an opening 111 of the storage compartment 11. Thus positioned, the lid 14 can be removed when the plurality of protective covers 4 is exhausted so that the user is able to mount more protective covers 4 within the storage compartment 11. Preferably, the lid 14 is hingedly connected to the container 1. Alternatively, the lid 14 is detachably mounted onto the container 1.

Figure 7:
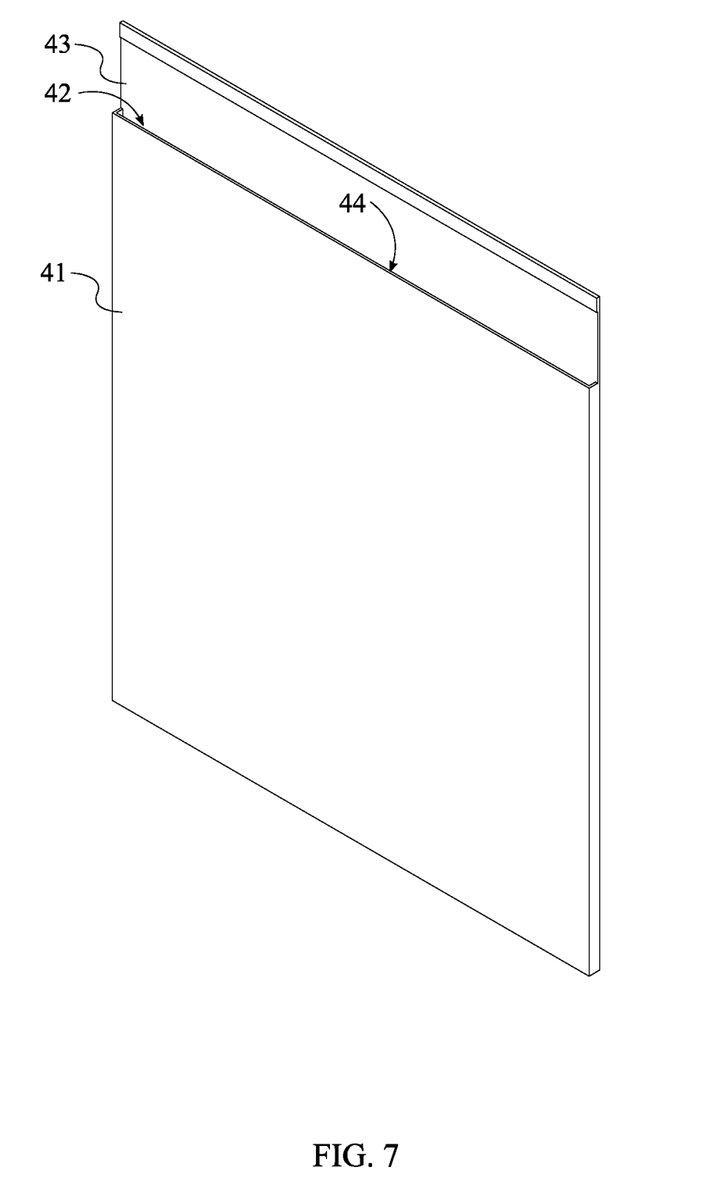
FIG. 7 is a perspective view of the protective enclosure used in the present invention.

Referring to FIG. 1 and FIG. 7, in the preferred embodiment of the present invention each of the plurality of protective covers 4 is a transparent and biodegradable sheath that is slipped around the exterior surface of the phone. To achieve this functionality, each of the protective enclosures comprises an enclosure body 41, a phone compartment 42, and a cover flap 43. The phone compartment 42 normally traverses into the enclosure body 41 so that the phone can be inserted into the enclosure body 41. The cover flap 43 is hingedly connected to the enclosure body 41. Further the cover flap 43 is positioned over an opening 44 of the phone compartment 42, wherein the cover flap 43 selectively seals the phone compartment 42. Accordingly, the cover flap 43 prevents the phone from falling out of the phone compartment 42. Preferably, an adhesive strip is positioned along the cover flap 43 so that the cover flap 43 can be secured over the phone compartment 42 while the phone is within the protective cover 4.

Although the invention has been explained in relation to its preferred embodiment, it is to be understood that many other possible modifications and variations can be made without departing from the spirit and scope of the invention as hereinafter claimed.

What is claimed is:
1. A protective phone cover dispenser comprising:
   a container;
   a storage compartment;
   a plurality of protective covers;
   an access hole;
   an external device coupler;
   the storage compartment normally traversing into the container;
   the plurality of protective covers being mounted within the storage compartment;
   the access hole normally traversing into the storage compartment through a first face of the container;
   the external device coupler being laterally mounted onto the container;
   the external device coupler being positioned offset from the access hole across the container;
   a plurality of access doors;
   the plurality of access doors being hingedly mounted to a rim of the access hole;
   the plurality of access doors being distributed around the access hole;
   a lid; and
   the lid being mounted over an opening of the storage compartment.

2. The protective phone cover dispenser as claimed in claim 1 comprising:
   the external device coupler comprising a plurality of mounting holes and a plurality of fasteners;
   the plurality of mounting holes traversing into a second face of the container, opposite to the access hole;
   the plurality of mounting holes being distributed across the second face;
   each of the plurality of fasteners being engaged into a corresponding hole from the plurality of mounting holes.

3. The protective phone cover dispenser as claimed in claim 1 comprising:
   each of the protective covers comprising an enclosure body, a phone compartment, and a cover flap;
   the phone compartment normally traversing into the enclosure body;
   the cover flap being hingedly connected to the enclosure body;
   the cover flap being positioned over an opening of the phone compartment, wherein the cover flap selectively seals the phone compartment.

4. The protective phone cover dispenser as claimed in claim 1, wherein the plurality of protective covers is composed of biodegradable materials.

5. The protective phone cover dispenser as claimed in claim 1, wherein the plurality of protective covers is transparent.

6. The protective phone cover dispenser as claimed in claim 1 comprising:
   a dispensing mechanism;
   the dispensing mechanism being mounted within the storage compartment;
   the dispensing mechanism being positioned in between a lateral sidewall of the interior compartment and the plurality of protective covers.

7. The protective phone cover dispenser as claimed in claim 6 comprising:
   the dispensing mechanism comprising at least one spring and a press plate;
   the spring being positioned in between the press plate and the lateral sidewall;
   the press plate being pressed against the plurality of protective covers.

* * * * *